Patented Mar. 22, 1938

2,111,650

UNITED STATES PATENT OFFICE 2,111,650

LIGHT SIGNAL

Wesley B. Wells, Wilkinsburg, and William K. Lockhart, Penn Township, Pa., assignors to The Union Switch & Signal Company, Swissvale, Pa., a corporation of Pennsylvania Application July 9, 1936, Serial No. 89,852

3 Claims. (Cl. 177—329)

Our invention relates to light signals, and particularly to light signals which are capable of selectively projecting a plurality of beams of light of different colors from a single light source.

We will describe one form of light signal embodying our invention, and will then point out the novel features thereof in claims.

Figure 1:
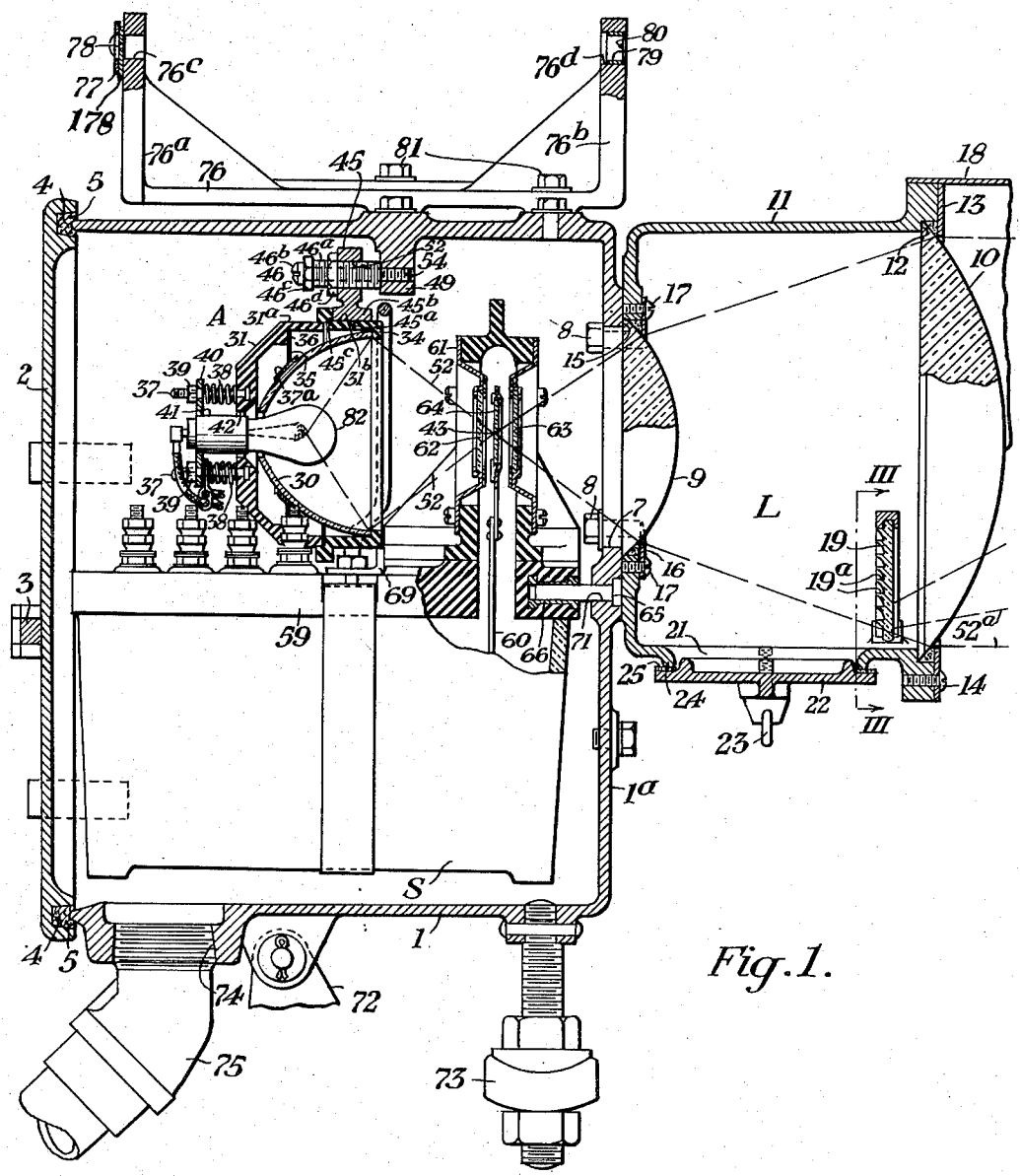
Figure 2:
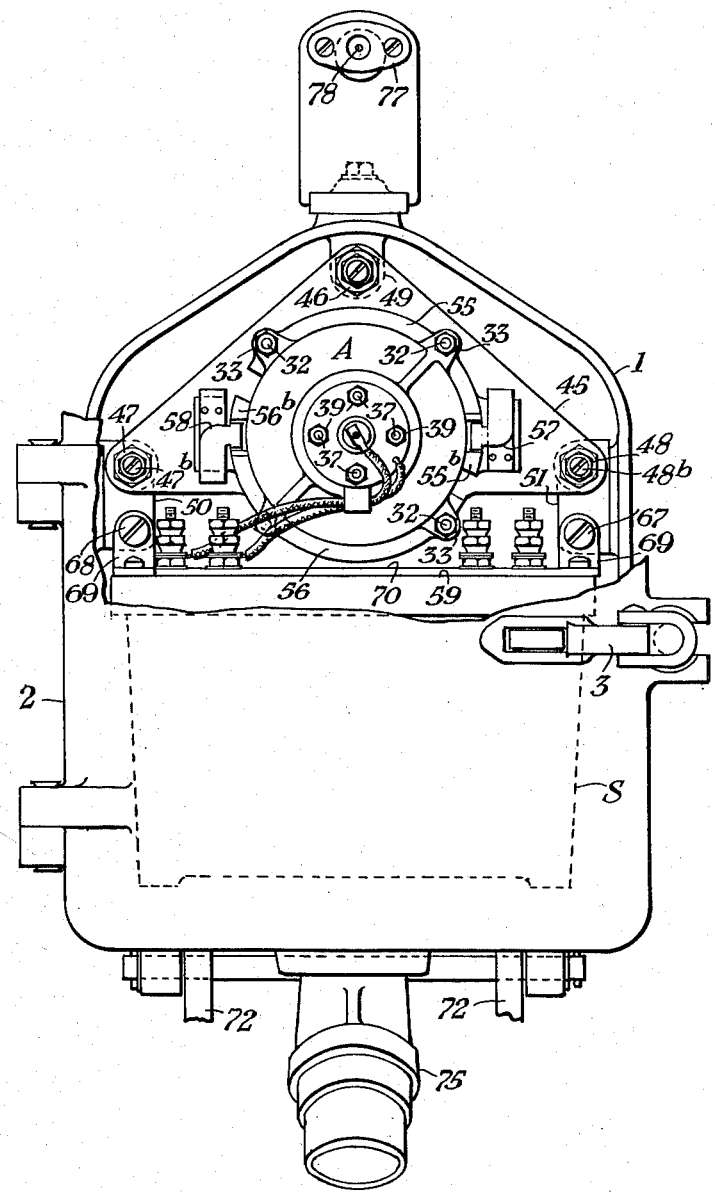
Figure 3:
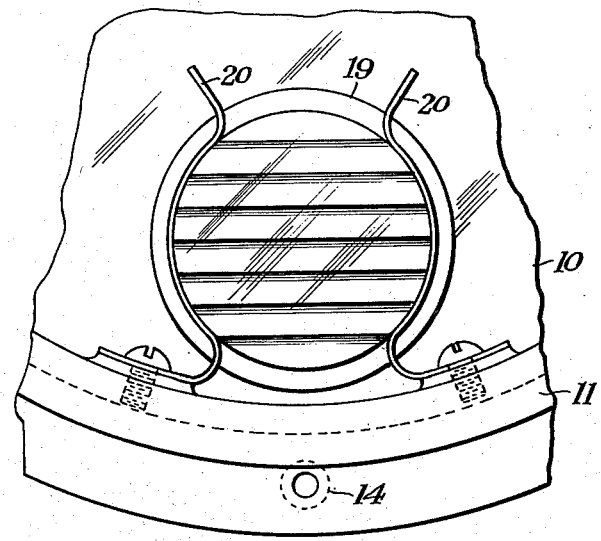
Figure 4:
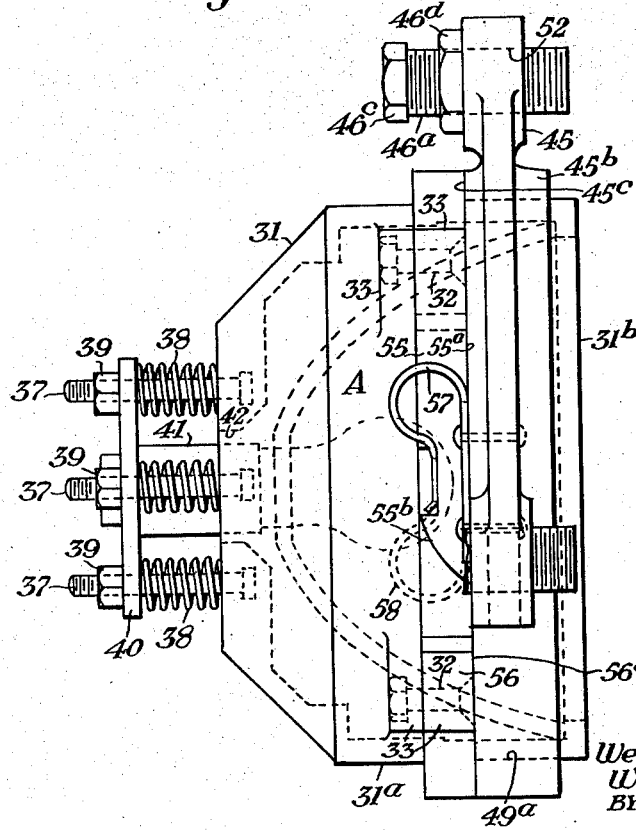

In the accompanying drawings, Fig. 1 is a vertical sectional view showing one form of light signal embodying our invention. Fig. 2 is a rear elevational view of the signal shown in Fig. 1, a portion of the door being broken away to better illustrate the construction of the parts. Fig. 3 is a detail sectional view of a portion of the signal shown in Figs. 1 and 2 taken on the line III—III of Fig. 1. Fig. 4 is a side view of the light unit A and associated supporting bracket 45 forming part of the signal illustrated in Figs. 1 and 2.

Similar reference characters refer to similar parts in each of the several views.

Referring first to Figs. 1 and 2, the light signal in the form here shown comprises a box-like casing 1 provided with a hinged rear door 2 through which convenient access to the entire inside of the casing may be had. The door 2 is arranged to be fastened in its closed position by means of a suitable fastening device 3, and is provided on its inner face with a groove 4 for the reception of packing 5, which, when the door is closed, engages the edges of the casing 1, and thus seals the casing against the entry of dirt or other foreign substances.

Formed in the forward wall 1ᵃ of the casing 1 is a large circular opening 7 through which the light rays from a light unit A which is disposed inside of the casing are adapted to be projected, and secured to the forward wall 1ᵃ directly in front of the opening 7 by means of four screws 8 spaced 90° apart is a lens unit L for concentrating the light rays emitted by the light unit A into a signal beam. The lens unit L is of well-known construction, and comprises a doublet consisting of two spaced lenses 9 and 10 mounted in the inner and outer ends, respectively, of a tubular casing 11, commonly referred to as a lens barrel. The outer lens 10 bears around its edges against the bottom of an annular groove 12 which is formed in the lens barrel, and is held in place by a ring member 13 and screws 14, a gasket of felt or the like being preferably interposed between the ring member and the edges of the lens. The inner lens 9 likewise bears at its edges against the bottom of an annular groove 15 which is formed in the inner end of the lens barrel and is held in place by a ring member 16 and screws 17, a gasket of felt or the like being interposed between the ring member and the edges of this lens. The two lenses 9 and 10 are of the well-known plano-convex type, and are both clear or colorless. Secured to the outer end of the lens barrel directly above the outer lens 10 is a hood 18 which performs the usual function of shielding the lens 10 from the direct rays of the sun.

Mounted in a vertical position between the two lenses 9 and 10 by means of two spring clips 20, which are secured at their lower ends to the lens barrel, as best seen in Fig. 3, is a prismatic screen 19, the inner face of which is provided with a plurality of horizontally disposed prisms 19ᵃ. The prisms 19ᵃ are so designed as to project a portion of the light rays from the light unit A upwardly and to spread them vertically, as indicated by the dash lines 52ᵃ. The signal when constructed in the manner shown is intended for use as a "dwarf" signal, that is to say, a signal which is disposed below the level of an engine cab, and the upwardly deflected rays provide an indication to an observer close to the signal, as will be readily understood.

To facilitate cleaning the inner lens 9 and the prismatic screen 19, the underside of the signal barrel is provided with a hand-hole 21 which is closed by a removable cover 22 held in place by a pair of thumb screws 23, only one screw 23 being visible in the drawings. The portion of the casing around the hole 21 is provided with a depending annular flange 24, and interposed between the cover 22 and this flange is a gasket 25 of cork or the like, which gasket seals the lens barrel against the entry of dirt, moisture or the like.

The light unit A referred to hereinbefore comprises an ellipsoidal reflector 30 mounted in an insulating casing 31, and an electric lamp 82, the filament of which is located at the focal point of the reflector 30. The casing 31 is preferably constructed of an insulating material which can be readily molded, such, for example, as a phenol condensation product, and comprises two parts 31ᵃ and 31ᵇ secured together by means of bolts 32 passing through aligned lugs 33. The reflector is held in place in the casing 31 by means of an inwardly extending annular flange 34 which is formed on the forward end of the part 31ᵃ, and by a ring member 35. The flange 34 engages the reflector at its forward edge, while the ring member 35 surrounds the rear portion of the reflector and abuts against an annular shoulder 36 which is formed on the part 31ᵇ. A felt band 37ᵃ is interposed between the ring member and the reflector to prevent damage to the reflector by the ring member. The rear wall of the part 31ª of the casing 31 is provided with four rearwardly projecting studs 37 arranged in rectangular formation, and mounted on these studs between compressed coil springs 38 which surround the flange portions of the studs, and nuts 39 which are adjustably screwed onto the outer ends of the studs, is a plate 40. This plate carries a socket 41 which projects with some clearance through a hole 42 formed in the rear wall of the part 31ª of the casing 31, and serves as a support for the previously referred to electric lamp 82. It will be apparent that by adjusting the nuts 39 the position of the lamp filament with respect to the reflector may be varied, and these nuts are so adjusted that the filament of the lamp will be located at the exact focal point of the reflector, thus enabling the maximum efficiency to be obtained from the light unit.

The light unit A is mounted in a triangular supporting bracket 45 in a manner which we will describe shortly, and the bracket 45, in turn, is adjustably secured by means of three adjustable fastening devices 46, 47, and 48, to three lugs 49, 50, and 51, which project inwardly from the top and two sides, respectively, of the casing 1. The fastening devices 46, 47, and 48 are similar, and a description of one will therefore suffice for all. Referring to the fastening device 46, for example, this fastening device comprises a threaded sleeve 46ª which is adjustably screwed through a tapped hole 52 formed in the bracket 45, and a fillister head screw 46ᵇ which extends with some clearance through the sleeve 46ª and is screwed at its inner end into a tapped hole 54 provided in the lug 49. The sleeve 46ª is provided at its outer end with a hexagonal flange or wrench grip 46ᶜ to facilitate turning the sleeve, and has mounted thereon a lock nut 46ᵈ for locking the sleeve in an adjusted position. The inner end of the sleeve 46ª is machined flat, and the surface of the lug 49 against which the sleeve bears is also machined flat. Furthermore, the surface of the lug 49 against which the sleeve 46ª bears is machined so that it lies in the same vertical plane as the corresponding surfaces of the lugs 50 and 51, and all three machined surfaces bear a fixed relation to the lens unit L of the signal.

In adjusting the fastening device 46, the lock nut 46ᵈ is backed off to unlock the sleeve 46ª, and the screw 46ᵇ is then backed out far enough to permit the sleeve 46ª to be rotated. The sleeve 46ª is then rotated to the desired position and locked in place by again tightening the lock nut 46ᵈ, after which the screw 46ᵇ is again tightened. The three adjustable fastening devices 46, 47, and 48 are so adjusted that the conjugate focal point 43 of the light unit A will coincide exactly with the focal point of the doublet combination, as indicated by dash lines 52. This adjustment is made in a dark room at the factory during the process of manufacture of the signal, and after this adjustment has once been made the sleeves are then permanently locked in place by means of the associated lock nuts 46ᵈ. The advantage of this arrangement is that if it subsequently becomes desirable to remove the light unit and bracket assembly as a whole from the signal case, as may sometimes happen, for reasons which will appear hereinafter, this can be done by merely removing the screws 46ᵇ, 47ᵇ, and 48ᵇ of the fastening devices, and when the unit and bracket are subsequently replaced and the screws 46ᵇ, 47ᵇ, and 48ᵇ are again tightened the location of the conjugate focal point 43 of the light unit will again coincide with the focal point of the lens unit.

In addition to being able to at times remove the light unit and bracket assembly as a whole from the signal, it is also desirable to be able to readily remove the light unit from the bracket 45 to enable the lamp 82 to be replaced when it burns out, and to facilitate cleaning the inner surface of the reflector 30. To this end, the bracket 45 is provided with a hole 45ª which receives the forward end of the casing of the light unit with a sliding fit, and with a boss 45ᵇ around the hole 45ª having an accurately machined vertically disposed surface 45ᶜ. The surface 45ᶜ of the boss 45ᵇ cooperates with the forward surfaces 55ª and 56ª of two semi-circular projections 55 and 56, which are molded on the part 31ª of the casing 31 of the light unit A, in such manner that when the surfaces 55ª and 56ª are engaging the surface 45ᶜ, the axis of the light unit will extend at right angles to the plane of the supporting bracket. The projections 55 and 56 are spaced from each other at their ends (see Figs. 2 and 4), and one end of each projection is formed with an integral latch catch 55ᵇ or 56ᵇ, which is adapted to cooperate with two latch springs 57 and 58 that are secured to the rear surface of the supporting bracket 45. The parts are so proportioned that if the light unit is pushed into the hole 45ª in either one of two angular positions spaced 180° apart, to the position in which the surfaces 55ª and 56ª engage the surface 45ᶜ of the boss 45ᵇ, the spring clips will enter the spaces between the ends of the projections 55 and 56, and that, if the unit is then rotated through a slight angle in a clockwise direction, as viewed in Fig. 2, the latch springs will pass over humps which form parts of the latch catches and will drop into notches which also form parts of the latch catches, thereby locking the light unit in a fixed position with respect to the supporting plane.

The light signal also comprises a suitable operating mechanism S for changing the color of the beam emitted by the signal to provide a plurality of signal indications. As here shown, this mechanism is similar in all respects to that described in our copending application for Letters Patent of the United States, Serial No. 88,768, filed on July 3, 1936, for Light signals, and if a full description of this mechanism is desired, reference may be had to this copending application. Briefly described, this mechanism comprises a top plate 59 of insulating material having secured thereto a polarized electro-responsive means for operating, between an intermediate and two extreme positions, a spectacle arm 60 which projects upwardly through a slot in the top plate into an auxiliary casing 61 which is secured to the top plate. The spectacle arm 60 is provided at its upper end with green, red, and yellow color screens which align respectively with two windows 62 and 63 of clear glass according as this spectacle arm occupies its one extreme position, its intermediate position, or its other extreme position. Only the red screen 64 is shown in the drawings, but spectacle arms of the type described are well known, and it is therefore deemed to be unnecessary to show this spectacle arm in detail herein.

The mechanism S is secured to the casing 1 by means of a supporting pin 65 which projects into a socket 66 formed in the top plate, and by means of two screws 67 and 68. The screws 67 and 68 project through upwardly extending lugs 69 formed on a strap 70 which is secured to the top plate 59, and are screwed into tapped holes formed in the lugs 50 and 51 directly below the holes which receive the screws 47ᵇ and 48ᵇ of the fastening devices 47 and 48. It will be noted that in order to fasten the mechanism S in place it is necessary to remove the light unit A and associated bracket 45. The pin 65 extends through a hole 71 in the forward wall 1ᵃ of the casing 1 and is held in place by means of the lens barrel. The mechanism is so positioned with respect to the casing 1 that the light rays emitted by the light unit A will pass through the windows 62 and 63 of the signal mechanism and the color screen which happens to be in alignment with these windows in the manner indicated in the dash lines 52. It will be apparent, therefore, that the signal will display a green, red, or yellow aspect according as the spectacle arm 60 occupies its one extreme position, its intermediate position or its other extreme position. The top plate 59 is provided with suitable terminal posts for making connections with the operating mechanism, and for the reception of the wires through which current is supplied to the light unit.

Secured to the bottom of the casing 1 are adjustable supporting means 72 and 73 for moving the signal casing to different positions. The bottom of the casing is also provided with an opening 74 for the reception of a conduit 75 through which wires may be led into the signal casing. These last-named parts are all of standard construction, and form no part of our present invention.

In some instances, it is desirable to provide suitable means to assist in directing the signal beam toward the desired zone of observation. For this purpose, a sighter comprising a bracket 76 provided with two vertically extending arms 76ᵃ and 76ᵇ is secured to the upper side of the casing 1 by means of studs 81. The arms of this sighter are provided with aligned holes 76ᶜ and 76ᵈ, the hole 76ᶜ being covered by a washer 178 adjustably held in place by a plate 77, said washer being provided with a peep hole 78, and the hole 76ᵈ being provided with a tube 79 having a pair of intersecting cross hairs 80 in its outer end. The washer 81 is so adjusted with respect to the cross hairs 80 during the manufacture of the signal that the line of sight provided by the peep hole and cross hairs extends parallel to the axis of the signal beam.

It should be pointed out that while the signal when constructed in the manner described is intended to be used as a "dwarf" signal, the signal may be converted into a "high" signal, that is to say, a signal which is intended to be located above the level of an engine cab, by merely removing the lens unit L from the casing, rotating it through an angle of 180°, and again fastening it to the casing, the parts being so constructed as to readily permit this change. When the lens unit is changed in this manner, it is necessary, of course, to change the position of the hood 18 so that it is again disposed above the outer lens 10.

It should also be pointed out that since the casing 31 of the light unit A is constructed of insulating material, if this casing should accidentally come in contact with any of the terminal posts which are mounted on the top plate 59 during the process of removing the light unit from the supporting bracket or restoring it to its proper position in the bracket, it will not short circuit any circuits the wires of which are connected to the terminal posts.

One advantage of a signal constructed in accordance with our invention is that since the light unit is accurately positioned with respect to the lens unit and the filament of the light unit is accurately positioned with respect to the reflector of the light unit in the manner described, the maximum possible signal efficiency is obtained.

Another advantage of a signal constructed in accordance with our invention is that the light units are interchangeable, thus making it possible to quickly and conveniently replace a light unit in case any part of it becomes unfit for use, for any reason.

A further advantage of a signal embodying our invention is that, due to the various adjustments that are provided, very little machining of the parts is required, thus reducing the cost of manufacture to a minimum.

A further advantage of a light signal embodying our invention is that all parts of the signal can be readily removed for inspection or repair and subsequently replaced without disturbing the efficiency of the signal.

Although we have herein shown and described only one form of light signal embodying our invention, it is understood that various changes and modifications may be made therein within the scope of the appended claims without departing from the spirit and scope of our invention.

Having thus described our invention, what we claim is:

1. A light signal comprising a casing having an opening provided with a lens unit, a bracket adjustably secured to said casing in a predetermined position with respect to the focal point of said lens unit, a housing attached to said bracket and containing a reflector and a light source located at the focal point of said reflector, and positioning means on the housing cooperating with the bracket for fixing the position of said reflector with respect to said casing, whereby the conjugate focal point of the reflector of any housing attached to said bracket will coincide with the focal point of said lens unit.

2. A light signal comprising a casing having an opening provided with a lens unit the focal point of which is located inside of said casing, a bracket having an opening and a machined surface surrounding said opening, a light unit comprising a housing containing a reflector and a light source accurately positioned at the focal point of said reflector, said reflector being of the type having a conjugate focal point and said light unit being provided with a positioning surface which bears a fixed relation to the conjugate focal point of said reflector, means for removably securing said light unit in the opening in said bracket in the position in which the positioning surface on said light unit engages the machined surfaces on said bracket in flat surface relationship, and means for adjustably securing said bracket to said casing so adjusted that the conjugate focal point of the reflector of any light unit secured to said bracket will coincide with the focal point of said lens unit.

3. A light signal comprising a casing having an opening, a lens unit secured to said casing in front of said opening, a bracket having a machined surface, a light unit comprising a housing containing a reflector having a conjugate focal point and an electric lamp the filament of which is accurately positioned at the main focal point of said reflector, said housing being provided with a surface which is accurately located with respect to the conjugate focal point of said reflector, means for detachably securing said light unit to said bracket with the surface of the housing which is accurately positioned with respect to the conjugate focal point of the reflector in contact with the machined surface of said bracket, whereby the conjugate focal point of any light unit secured to said bracket will bear a fixed relation to the housing, means for adjustably securing said bracket to said casing so adjusted that the conjugate focal point of the reflector of the light unit when the light unit is secured to the bracket will coincide with the focal point of said lens unit, and means disposed at the focal point of the lens unit for controlling the rays of light passing from said light unit to said lens unit.

WESLEY B. WELLS.
WILLIAM K. LOCKHART.